Oct. 13, 1959 J. L. R. WILLIAMS 2,908,667

PHOTOGRAPHIC PROCESS USING LIGHT-SENSITIVE POLYMERIC QUATERNARY SALTS

Filed Oct. 6, 1955

JACK L. R. WILLIAMS
INVENTOR.

BY Daniel I. Mayne
W. H. McDowell
ATTORNEY & AGENT

United States Patent Office 2,908,667

Patented Oct. 13, 1959

2,908,667

PHOTOGRAPHIC PROCESS USING LIGHT-SENSITIVE POLYMERIC QUATERNARY SALTS

Jack L. R. Williams, Rochester, N.Y., assignor to Eastman Kodak Company, Rochester, N.Y., a corporation of New Jersey Application October 6, 1955, Serial No. 538,910

11 Claims. (Cl. 260—79.3)

Figures 1, 2, 3:
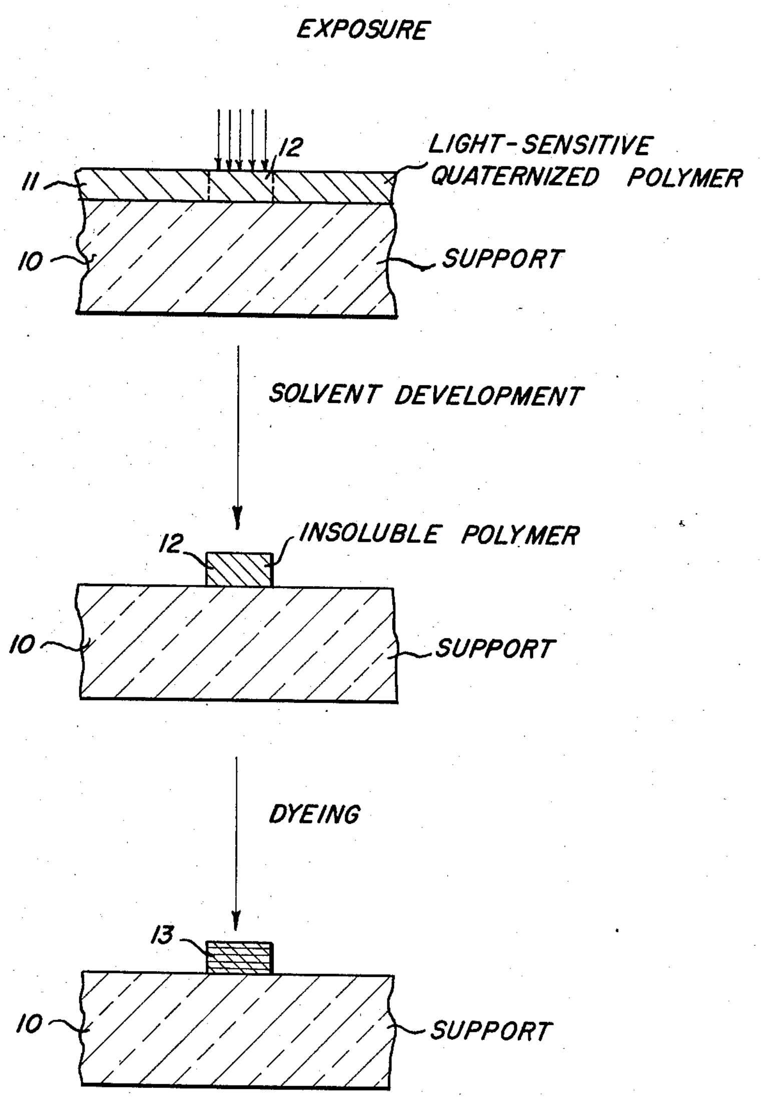

This application is a continuation-in-part of Williams U.S. patent application Serial No. 397,706, filed December 11, 1953, now abandoned.

This invention relates to a photographic reproduction process which utilizes certain light-sensitive polymeric quaternized salts.

My investigation of polymeric quaternary ammonium light-sensitive materials has indicated that an appreciable variation in light sensitivity and usefulness exists in these materials. That is, it was desired to synthesize a light-sensitive polymer which could be exposed to a photographic subject to insolubilize the polymer in the exposed region so as to allow the unexposed polymer to be dissolved away leaving a relief image on the support which could be readily dyed preferably without the use of an auxiliary dye mordant. The quaternary polymer poly-2-vinyl pyridine methyl-p-toluene sulfonate obtained by the reaction of poly-2-vinyl pyridine with methyl-p-toluene sulfonate was examined and found to possess too low light sensitivity to be of practical use for the purpose. Similarly, the quaternary polymer from the reaction of poly-4-vinyl pyridine with 2,4-dinitrochlorobenzene was deficient. Another polymeric quaternary salt obtained by the reaction of poly-4-vinyl pyridine and styrene bromohydrin and having recurring units of the probable structure

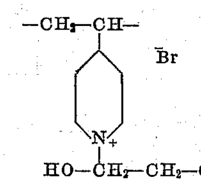

also was of limited value in the process. Simple quaternary compounds such as 1-styryl pyridine bromide

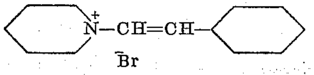

and 2,4-dinitrophenylpyridine chloride were also investigated and found to possess low light sensitivity and thus were of limited value in the process.

I have discovered that polymeric quaternary ammonium salts obtained by the reaction of polyvinyl sulfonates such as polyvinylbenzene sulfonate, polyvinyltoluene sulfonate and polyvinylmethyl sulfonate with pyridine and pyridine derivatives possess good light sensitivity and relief images prepared therefrom can be readily dyed particularly to provide colored reproductions of subjects or to provide relief images which may be used as resist images in various processes of the photomechanical art.

These light-sensitive quaternized polyvinyl sulfonates contain recurring units having the general formula

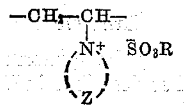

wherein Z represents the atoms necessary to complete a nucleus of the pyridine, quinoline or iso-quinoline series and R represents either an alkyl group of 1 to 4 carbon atoms or a monocyclic aryl group of the benzene series such as phenyl or p-tolyl, for example, the polymers may contain in the position of the polymer chain indicated, either a 1-pyridyl, 2-aminopyridyl, 2-amino-3-methylpyridyl, 2-amino-4-methylpyridyl, 2-amino-5-methylpyridyl, 2-amino-6-methylpyridyl, 2-methyl pyridyl, 4-methyl pyridyl, 2-methylquinolyl, 4-methylquinolyl as well as pyridyl and quinolyl nuclei substituted with the $—(CH{=}CH)_nR_1$ group described hereinafter.

A particularly efficacious group of polymers having the above general formula have the more specific general structure

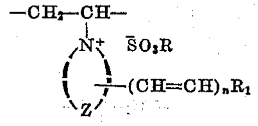

wherein Z represents the atoms necessary to complete a nucleus of the pyridine series, R represents a group as mentioned above, particularly a methyl group or a monocyclic aryl group of the benzene series, $n$ represents a positive integer of from 1 to 2, $R_1$ represents either a monocyclic group of the furan series or a monocyclic aryl group of the benzene series. The group $—(CH{=}CH)_nR_1$ is attached to the pyridine nucleus in either of the ortho or para positions relative to the nitrogen atom. The corresponding meta isomer having the $—(CH{=}CH)_nR_1$ group in a position meta to the nitrogen atom of the pyridyl nucleus are not readily synthesized by the procedures used for preparing the corresponding ortho and para materials.

Accordingly, the ortho and para polymers have the two structures

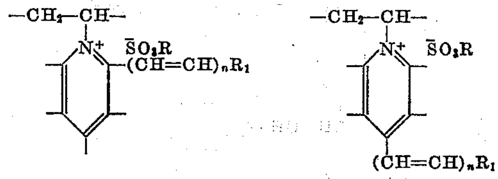

wherein other substituents can be attached to the unsatisfied valences of the pyridyl nuclei, $n$ is 1 or 2, R is as above mentioned, for example, methyl, phenyl or p-tolyl and $R_1$ is as above mentioned, for example, a phenyl, p-tolyl, anisyl, p-dimethylaminophenyl, 2-furyl or 3-furyl group, naphthyl, or anthryl.

Examples of polymers illustrating my invention are those containing recurring units having the following formulas:

(1)

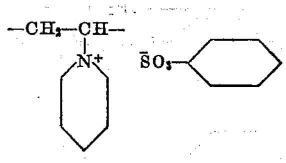

(2)

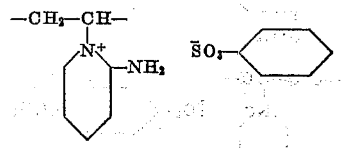

(3)

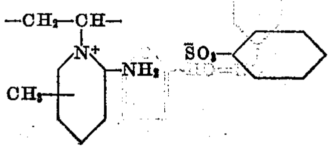

(4)

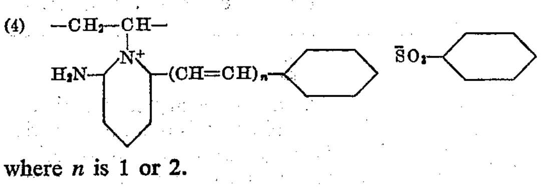

where $n$ is 1 or 2.

(5)

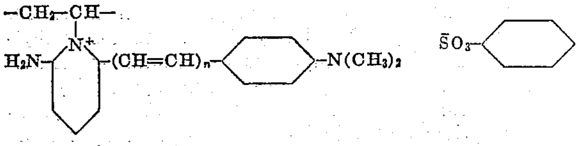

where $n$ is 1 or 2.

(6)

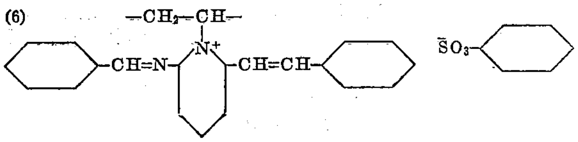

As in the case of the polymer having Formula 11, this polymer can also contain unreacted quaternized vinyl-4-picoline units as well as vinyl alcohol and vinyl-p-toluene sulfonate units. In the case of this and the other polymers herein described the initial polyvinyl sulfonates used in preparation of the light-sensitive polymers may have been prepared by the homopolymerization of vinyl esters of the sulfonic acids as described in Sauer U.S. Patent 2,667,469, e.g., homopolymers of vinyl methane, vinyl toluene, vinyl benzene and vinyl butane sulfonic acids, from which quaternized light-sensitive homopolymers can then be obtained as described hereinafter. The vinyl esters of the sulfonic acids can also be copolymerized with other polymerizable materials such as vinyl acetate and these copolymers then quaternized and, if desired, further reacted to introduce the —$(CH{=}CH)_nR_1$ group into the nuclei containing the quaternary nitrogen atom.

(7)

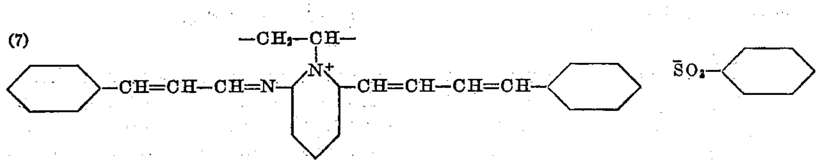

(8)

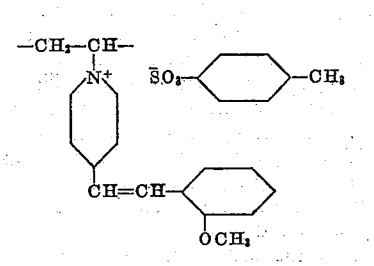

(9)

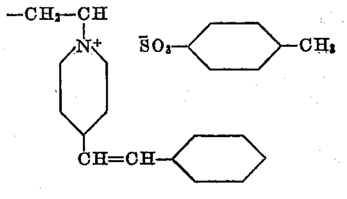

(10)

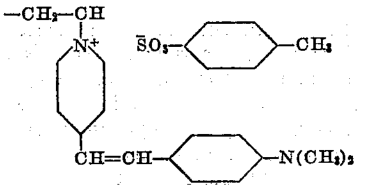

(11)

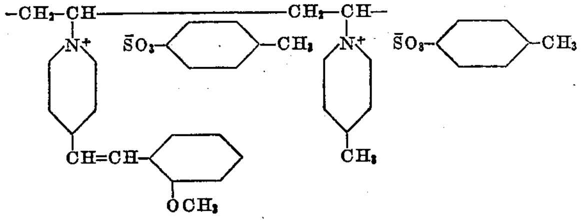

(12)

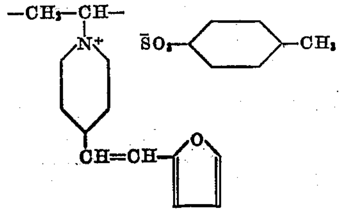

(13)

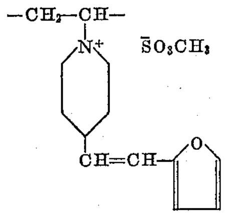

(14)

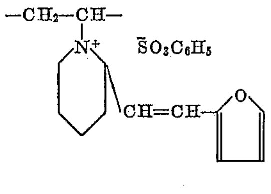

(15)

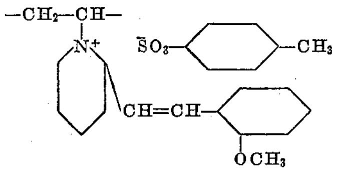

The polymers containing the indicated group —$(CH{=}CH)_nR_1$ are much more light-sensitive than, for example, polymers containing units of Formulas 1, 2 or 3. The most light-sensitive polymers are those in which the —$(CH{=}CH)_nR_1$ group is in the para position of the pyridyl nucleus. The ortho polymers, for example, those having units of Formulas 4, 5, 6, 7, 14 and 15 have comparable sensitivity. The furan polymer 12 is the most light-sensitive polymer of all.

In the accompanying drawings is illustrated a process for using the polymeric quaternary salts in making relief images.

The following examples illustrate the preparation and use of the light-sensitive polymers of the invention. The syntheses are, of course, carried out under reduced illumination.

*Example 1*

The polymer having the quaternary salt units No. 1 above was prepared as described in U.S. Patent 2,571,761, Example 1, by reaction of polyvinyl benzene sulfonate with pyridine.

*Example 2*

Polymer No. 2 above was prepared as described in Example 1 of Reynolds et al. U.S. Patent 2,701,243.

*Example 3*

Polymer No. 3 above was prepared by reaction of polyvinyl benzene sulfonate with 2-amino-6-methyl pyridine as described in the Reynolds et al. invention.

The polymers isomeric to that prepared from 2-amino-6-methyl pyridine were prepared in the same manner using either 2-amino-3-methyl pyridine, 2-amino-4-methyl pyridine or 2-amino-5-methyl pyridine instead of 2-amino-6-methyl pyridine, as described in Examples 3, 4 and 5 respectively, of the Reynolds et al. invention.

*Example 4*

The polymer having the formula No. 4 above in which $n$ is 1 was prepared as follows:

A solution of 1 gram of the 2-amino-6-methyl pyridine polymer of Example 3, 1 gram of benzaldehyde and 2 drops of piperidine in 40 cc. of ethyl alcohol was heated at 75° C. for 2½ hours. The reaction mixture was evaporated at 10 cc. and the polymer precipitated in dry ether. The polymer was dissolved in 10 cc. of methyl alcohol and reprecipitated in ether to a dry weight of 1.05 gram. Analysis: C, 60.5; H, 6.2; N, 17.2.

It is believed that during the course of this reaction some of the 2-amino-6-methylpyridyl groups react with 2 mols of benzaldehyde to produce some polymeric units having the structure No. 6 above.

The quaternary polymer No. 4 above in which $n$ is 2 is prepared in a similar manner using cinnamic aldehyde in place of benzaldehyde. As in the case of benzaldehyde, some of the 2-amino-6-methylpyridyl units appear to react with 2 mols of cinnamic aldehyde to obtain some units having structure No. 7 above.

*Example 5*

The polymer No. 5 wherein $n$ is 1 was prepared as follows:

A solution of 5.8 grams of the quaternary salt of 2-amino-6-methyl pyridine with polyvinyl benzene sulfonate of Example 3, 2.9 grams of p-dimethylaminobenzaldehyde and 8 drops of piperidine in 40 cc. of ethyl alcohol was refluxed in the dark for three hours. The polymer was precipitated in dry ether and reprecipitated from methyl alcohol into ether. The yield was 4.5 grams. Analysis: C, 58.5; H, 6.2; N, 9.4.

*Example 6*

Polymer No. 5 wherein $n$ is 2 is made in the same manner by heating 2.4 grams of the polymer No. 3 with 1.5 grams of p-dimethylaminocinnamaldehyde and 5 drops of piperidine in 20 cc. of methyl alcohol for three hours in the dark. The product was purified as in Example 5 to obtain a yield of 2.5 grams of polymer. Analysis: C, 60.5; H, 6.6; N, 8.8.

*Example 7*

A polymer containing units of Formula 8 above was prepared as follows:

The quaternary salt of polyvinyl-p-toluene sulfonate (U.S. Patent 2,571,761, Example 14), was reacted with 4-picoline in the manner described in Example 10 of U.S. Patent 2,571,761. If desired, as mentioned above, the polyvinyl-p-toluene sulfonate may have been prepared by homopolymerization of the vinyl-p-toluene sulfonate by copolymerization with other polymerizable monomers. To 7 grams of this salt in 50 ml. of methanol was added 0.5 ml. of piperidine and 30 ml. of anisaldehyde. The reaction mixture was made homogeneous by agitation and then allowed to stand at room temperature for 46 hours. The polymer was precipitated in anhydrous ether and washed several times with ether to remove traces of aldehyde. The polymer was then dried in vacuo at room temperature. The resultant quaternized polymer containing units of Formula 8 above is also believed to contain some unreacted vinyl alcohol units as well as vinyl-p-toluene sulfonate units and quaternized vinyl-4-picoline units.

A 0.75 percent solution of the resultant polymer in water-methanol (1:1 by volume) was coated on a support, exposed under a photographic step tablet, developed with the same water-methanol solvent mixture to remove the soluble portion of the coating. A speed value of 800 was assigned to this polymer on the basis of the number of steps of the step tablet which had been reproduced by the light exposure. On this same speed scale a bichromated albumin coating would have a speed value of about 30, an unsensitized polyvinyl cinnamate coating a speed value of about 2 and a sensitized polyvinyl cinnamate coating a speed value of from 1,000 to 2,000.

*Example 8*

The polymer containing units of Formula 9 above was prepared as follows:

The procedure of Example 7 was carried out except using 25 ml. of benzaldehyde in place of anisaldehyde and a reaction time of 24 hours instead of 46 hours. The polymer had a speed value of 700.

*Example 9*

A polymer containing units of Formula 10 above was prepared as follows:

The process of Example 7 was carried out except using 37 grams of p-dimethylaminobenzaldehyde with a reaction time of 24 hours. The polymer had a speed value of 20.

*Example 10*

A polymer containing units of Formula 8 above as well as some unreacted vinyl-4-picoline salt units was prepared as follows:

The procedure of Example 7 was carried out except using 20 ml. of anisaldehyde with a reaction time of 46 hours. The polymer had a speed value of 65. The lower speed value of this polymer compared to that of Example 7 is attributed to the lower number of light-sensitive groups present in the polymer. Formula 11 above illustrates the polymeric units present in this polymer; there may also be present in the polymer chain some unreacted vinyl alcohol and vinyl-p-toluene sulfonate units.

*Example 11*

A polymer containing units of Formula 12 above was prepared as follows:

The procedure of Example 7 was carried out except 2 grams of the quarternary salt of 4-picoline with polyvinyl-p-toluene sulfonate was reacted in 20 ml. of chloroform with 10 ml. of 2- furaldehyde for 48 hours. The polymer had a speed value of 14,000. The exceptionally high speed value of this polymer is presumably due to the long chain of conjugation containing the 2-furyl substituent.

*Example 12*

A polymer containing units of Formula 12 above was prepared as follows:

The procedure of Example 11 was carried out except that 2 grams of the quaternary salt of 4-picoline with polyvinyl-p-toluene sulfonate was reacted in 20 ml. of methanol. A speed value of 3500 was obtained in this case upon evaluation of the polymer as described above.

Polymers containing units of Formula 13 above are prepared in the manner of Example 7 substituting polyvinylmethane sulfonate (U.S. Patent 2,571,761, Example 16) quaternized with 4-picoline and the resultant quaternary salt reacted with 2-furaldehyde or 3-furaldehyde as in Example 11 above.

Polymers containing units of Formula 14 above are prepared as described in Example 6 using polyvinylbenzene sulfonate quaternized with 2-picoline followed by reaction of the salt with 2-furaldehyde or 3-furaldehyde as described above.

*Example 13*

A light-sensitive material containing a cellulosic chain rather than a vinyl polymer chain can be prepared as follows:

115 grams of cellulose monoacetate dried for 2 hours at 110° C. were dissolved in 750 cc. of dry pyridine. To this solution was added a solution of 380 grams of p-toluenesulfonyl chloride in 500 cc. of dry pyridine. The reaction mixture was left at room temperature for 42 hours. The resultant dope was filtered and precipitated in 8 liters of methanol. The precipitate was washed with methanol and dried under vacuum. The resulting cellulose acetate-p-toluene sulfonate was then quaternized as described above by reaction with pyridine or pyridine derivatives such as 2-picoline or 4-picoline, thereafter various aldehydes such as benzaldehyde, anisaldehyde, cinnamaldehyde, 2-furaldehyde or 3-furaldehyde were reacted with the resulting pyridyl cellulose salt to add the $—(CH{=}CH)_nR_1$ group to the pyridyl nucleus in the ortho or para positions.

Cellulose derivatives containing the $\bar{S}O_3C_6H_5$ or $\bar{S}O_3CH_3$ anion can be made similarly using benzene sulfonyl chloride or methane sulfonyl chloride in the synthesis of the original cellulose sulfonate.

The manner in which the above quaternary polymers are used in my invention will further be understood by consideration of the following examples in reference to the accompanying drawings:

*Example 14*

A solution of 1 gram of the 2-aminopyridine polymer of Example 2 in 20 cc. of methyl alcohol was coated upon a paper support and exposed through a negative for 30 minutes using a sun lamp at a distance of 10 inches. A clear print-out image appeared and a relief image of insoluble polymer was obtained by developing the exposed layer for two minutes using methyl alcohol to wash away the unexposed regions of the coating. The image was then dyed with Erio Fast Cyanine, i.e., phenyl-di-p[N-ethyl-N-(β-sulfoethyl)]-aminophenyl carbinol ammonium salt from water solution.

The process is illustrated in the accompanying drawings wherein stage 1 shows the support 10 of paper, cellulose ester, etc., carrying the layer 11 of light-sensitive polymer being exposed in region 12 to light transmitted for example by a silver negative which may be a well known color-separation negative of a subtractive color process. As a result of the exposure, the polymer layer is insolubilized in region 12 and is then developed with a solvent to leave the insoluble polymer image 12 on support 10 as shown in stage 2. Thereafter the relief image is dyed yielding the element of stage 3 having the dyed relief image 13 on support 10.

*Example 15*

The procedure of Example 7 was carried out with the light-sensitive polymer coating on a cellulose ester film base instead of paper yielding a cyan transparency corresponding to the negative.

*Example 16*

The quaternary salt of polyvinyl benzene sulfonate with 2-amino-5-methyl pyridine of Example 3 was coated onto paper, exposed and developed with methyl alcohol and then dyed as in the above examples to obtain a blue relief image corresponding to the negative. A comparable result was obtained by coating the same polymer upon a film base exposing, developing in ethyl alcohol and dyeing cyan.

*Example 17*

The quaternary salt of polyvinyl benzene sulfonate with 2-amino-4-methyl pyridine of Example 3, coated upon paper, was exposed under a step tablet, developed in ethyl alcohol for 5 minutes, followed by 30 seconds development in methyl alcohol, after which the relief image obtained was dyed a cyan color as above.

*Example 18*

One gram of the quaternary salt of polyvinyl benzene sulfonate with 2-amino-6-methyl pyridine in 40 cc. of methyl alcohol was coated upon paper, exposed, developed with ethyl alcohol and dyed as above.

*Example 19*

A 4 percent solution of the quaternary salt of polyvinyl benzene sulfonate with 2-amino-3-methyl pyridine of Example 3 in methanol was coated onto a film base, exposed, developed two minutes with ethyl alcohol and dyed as above. The image was clear and sharp. Other strips of the developed polymer image were dyed yellow from ethyl alcohol solution of the dye 4-p-methoxyphenylazo-3-methyl-1-p-sulfophenyl-5-pyrazolone and magenta with the dye 1-carbethoxy-2-keto-3-methyl-6(4′-methyl-2′-sulfo)-3-azabenzanthrone ammonium salt.

*Example 20*

A methanol solution of the quaternary salt of polyvinyl benzene sulfonate with 2-amino-6-methyl pyridine reacted with p-dimethylaminobenzaldehyde (Example 5) was coated onto film base. The coating was exposed, developed with ethyl alcohol and dyed cyan with an aqueous solution of the above cyan dye.

In another process three samples of the light-sensitive coating were exposed through the support to red, green and blue color-separation negatives of the subject for five, three, and three minutes respectively, followed by developing the relief images for three minutes in n-propyl alcohol and dyeing with the above cyan, magenta and yellow dyes respectively, from aqueous solution. When the dyed relief images were superimposed in registry a colored transparency was obtained. In a similar process three of the films were exposed for 10 minutes to each separation negative, developed in n-butyl alcohol for 10 minutes and dyed subtractively and superimposed to obtain a transparency in which the blacks of the subject were reproduced as an almost neutral color.

While satisfactory results were obtained in the above example using ethyl alcohol for developing the polymeric relief images, experiments indicate that the higher alcohols, particularly n-propyl alcohol and n-butyl alcohol produced better results, that is, less overdevelopment and reversal are obtained. Poor results were obtained in some cases using isopropyl alcohol, t-butyl, sec.-butyl, n-amyl, methoxyethyl and phenoxyethyl alcohols. Similarly, the exposure level of the sensitive coating should be correlated with the solvent used for development and the development time, to prevent overexposure which is sometimes manifested by stripping of the exposed area of the coating from the support.

*Example 21*

A solution of 1 gram of the quaternary salt of polyvinyl benzene sulfonate with 2-amino-5-methyl pyridine reacted with p-dimethylamino cinnamic aldehyde (Example 6) in 20 cc. of methyl alcohol was coated onto a film base, exposed under the step tablet and developed in n-butyl alcohol for two minutes. The relief image was then dyed cyan as above from aqueous solution.

In a subtractive color process, three samples of the same sensitive polymer coated on film base were each exposed through the support for five minutes under a sun lamp to red, blue and green color-separation negatives, followed by development for 20 minutes in n-butyl alcohol. After dyeing the resultant relief images with the above cyan, magneta and yellow dyes from aqueous solution and super-imposing the dyed reliefs, a subtractively colored transparency was obtained.

*Example 22*

The quaternary polymers of the invention are further useful for the preparation of dyed relief images in hydrophilic colloid layers containing vehicles insensitive to light as follows:

A solution of 0.7 gram of gelatin and 0.2 gram of the quaternary salt of polyvinyl benzene sulfonate with 2-amino-6-methyl pyridine reacted with dimethyl amino cinnamaldehyde (Example 6) in 18 cc. of water was coated on a paper support. The coating was dried at 45° C. for two hours. Exposure through a negative by means of two sun lamps located 10 inches from the coating gave a faint print-out image. The image was divided into several portions for development. Development for 30 seconds in 40° water removed the image almost completely. A small amount of the image was retained in the higher exposure areas as indicated by dye. Development for five minutes in 30° water gave a visible relief image which when dyed and dried disappeared. The whole area was dyed indicating incomplete development. Development for 10 minutes in 30° water caused overdevelopment to the extent that the image was faint but yet better than that obtained in the first case. Development for 10 minutes at 27°, then 10 minutes at 30° gave a visible image. The whole became blue when dyed, but the unexposed areas were then washed off in 35° water to give an excellent relief image.

In a similar manner other hydrophilic colloid layers, for example, of polyvinyl alcohol, casein, gum arabic and the like, can be locally insolubilized by incorporating one of the polymers of the invention in the layer and after exposure, developing a relief image as described in the above example.

*Example 23*

A polymer combining units of Formula 15 above was prepared by carrying out the procedure of Example 7 but using 2-picoline instead of 4-picoline. The resultant polymer has a speed comparable to the polymer of Example 7.

It has been indicated that the light-sensitive polymers of the invention illustrated above are particularly adapted to the preparation of polymeric relief images on various supports, which images can be readily dyed. However, the polymers can be used in any of the photographic processes which require the formation of a relief or resist image such as in the preparation of resist images for printing purposes on hydrophilic supports such as casein, or on metal supports such as grained zinc, copper, aluminum or magnesium or on surface-hydrolyzed cellulose ester, paper or synthetic polymer supports. The polymers are merely coated from suitable solvent upon such supports, exposed to the subject such as a line or half-tone subject, followed by removal of the unexposed area of the coating to leave an insolubilized polymeric image on the support. In the printing art, in some cases, as in lithography, printing may follow directly after formation of the resist image on the support or in other printing processes conventional etching steps may be carried out using the insolubilized polymer image as a resist. U.S. Patent 2,670,286 and Merrill et al. U.S. patent application Serial No. 525,271, filed July 29, 1955, may be referred to for some of the numerous photomechanical processes in which the light-sensitive polymers illustrated above can be used, of course, employing organic solvents for coating and developing the exposed polymer layers.

What I claim is:

1. A light-sensitive photographic element comprising a support having thereon a layer of a light-sensitive polymeric reaction product of (A) an aromatic aldehyde of the benzene series with (B) the reaction product of a methyl pyridine with a benzene sulfonic acid ester of polyvinyl alcohol.

2. A light-sensitive photographic element comprising a support having thereon a layer of a light-sensitive polymeric reaction product of (A) an aldehyde of the furan series with (B) the reaction product of a methyl pyridine with a benzene sulfonic acid ester of polyvinyl alcohol.

3. A light-sensitive photographic element comprising a support having thereon a layer of a light-sensitive polymeric reaction product of (A) 2-furfuraldehyde with (B) the reaction product of a methyl pyridine with a benzene sulfonic acid ester of polyvinyl alcohol.

4. A light-sensitive photographic element comprising a support having thereon a layer of a light-sensitive polymeric reaction product of (A) benzaldehyde with (B) the reaction product of a methyl pyridine with a benzene sulfonic acid ester of polyvinyl alcohol.

5. A light-sensitive photographic element comprising a support having thereon a layer of a light-sensitive polymeric reaction product of (A) anisaldehyde with (B) the reaction product of a methyl pyridine with a benzene sulfonic acid ester of a polyvinyl alcohol.

6. A light-sensitive photographic element comprising a support having thereon a layer of a light-sensitive polymeric reaction product of (A) benzaldehyde with (B) the reaction product of 4-picoline with a benzene sulfonic acid ester of polyvinyl alcohol.

7. A light-sensitive photographic element comprising a support having thereon a layer of a light-sensitive polymeric reaction product of (A) anisaldehyde with (B) the reaction product of 4-picoline with a benzene sulfonic acid ester of polyvinyl alcohol.

8. A light-sensitive photographic element comprising a support having thereon a layer of a light-sensitive polymeric reaction product of (A) benzaldehyde with (B) the reaction product of 4-picoline with a p-toluene sulfonic acid ester of polyvinyl alcohol.

9. A light-sensitive photographic element comprising a support having thereon a layer of a light-sensitive polymeric reaction product of (A) anisaldehyde with (B) the reaction product of 4-picoline with a p-toluene sulfonic acid ester of polyvinyl alcohol.

10. A light-sensitive photographic element comprising a support having thereon a layer of a light-sensitive polymeric reaction product of (A) 2-furfuraldehyde with (B) the reaction product of 4-picoline with a benzene sulfonic acid ester of polyvinyl alcohol.

11. A light-sensitive photographic element comprising a support having thereon a layer of a light-sensitive polymeric reaction product of (A) 2-furfuraldehyde with (B) the reaction product of 4-picoline with a p-toluene sulfonic acid ester of polyvinyl alcohol.

References Cited in the file of this patent

UNITED STATES PATENTS

| | | |
|---|---|---|
| 2,459,129 | Gresham et al. | Jan. 1, 1949 |
| 2,500,052 | Yackel | Mar. 7, 1950 |
| 2,531,468 | Reynolds et al. | Nov. 28, 1950 |
| 2,571,761 | Reynolds et al. | Oct. 16, 1951 |
| 2,725,368 | Reynolds et al. | Nov. 29, 1955 |
| 2,811,443 | Robertson | Oct. 29, 1957 |

OTHER REFERENCES

Hickinbottom: "Reactions of Organic Compounds," p. 72, Longmans, Green & Co. (1948). (Copy in Library.)

Hickinbottom: "Reactions of Organic Compounds," p. 72, Longmans, Green & Co. (1948). (Copy in Library.)